Dec. 7, 1937.  A. W. OWENS  2,101,340

HOLDER FOR OPTICAL INSTRUMENTS

Filed Aug. 6, 1935

Inventor
Adolphus W. Owens

By Hardway Mather
Attorneys

Patented Dec. 7, 1937

2,101,340

UNITED STATES PATENT OFFICE 2,101,340

HOLDER FOR OPTICAL INSTRUMENTS

Adolphus W. Owens, Houston, Tex.

Application August 6, 1935, Serial No. 34,889

2 Claims. (Cl. 88—39)

This invention relates to a holder and has particular relation to a holder for optical instruments such as microscopes, and the like.

An object of the invention is to provide a holder of the character described, specially designed for holding optical instruments such as microscopes, and the like, and equipped with a guard of soft material, such as velvet, which will prevent the metal parts of the holder from coming into contact with the lens of the eye glass of the user, and scratching, or otherwise injuring the eye glass lens.

A further object of the invention is to provide a holder of the character described, whose parts may be readily dismembered for repairs, or replacements.

With the above and other objects in view, the invention has particular relation to certain novel features of construction, arrangement of parts, and use, an example of which is given in this specification and illustrated in the accompanying drawing, wherein.

Figure 1:
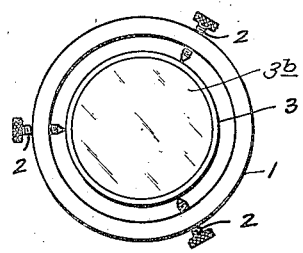
Fig. 1 shows an end view of the holder, with an implement therein.
Figure 3:
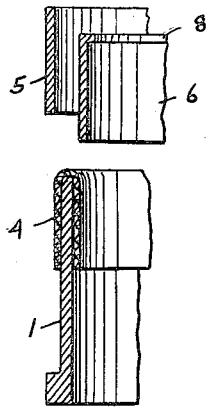
Fig. 3 shows a fragmentary sectional view of the parts of the holder in position to be assembled.
Figure 2:
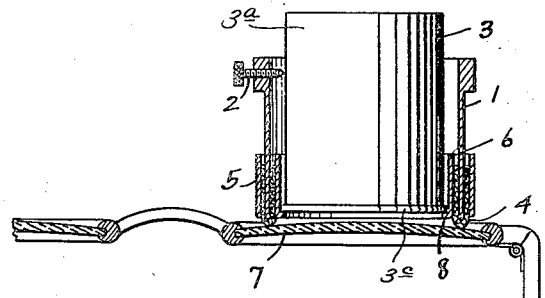
Fig. 2 shows a sectional view of the holder, shown in the position it will occupy relative to the lens of an eye glass while in use, and showing the optical implement therein.

Referring now more particularly to the drawing, wherein like numerals of reference designate similar parts in each of the figures, the numeral 1 designates the barrel of the holder which is preferably cylindrical in form, and composed of suitable material such as metal. The outer end of the barrel is outwardly thickened to provide material for the adjusting screws 2 which are threaded therethrough. The inner ends of these screws are pointed to engage the microscope 3, or other optical instrument in the holder. As shown, the microscope comprises the tubular barrel 3a, one end of which contains the lens 3b, and said last mentioned end of the barrel has the outwardly extended flange 3c. The outer ends of the screws have knurled heads for adjustment purposes.

The other end of the barrel 1 has a strip of soft material 4 such as velvet folded thereover, and this velvet is clamped in place by the outer and inner clamp rings 5, 6. It will be noted that the fold of soft material 4 projects slightly beyond the clamp rings so that when the holder is in use, the soft material may rest against the eye glass lens 7 to space the metal parts away from said lens so that it will not be scratched, or marred by said metal parts.

The outer end of the inside ring 6 has an inwardly extending ledge 8 therearound, forming an abutment which serves as a stop for the microscope 3 when it is inserted into the holder.

The drawing and description disclose what is now considered to be a preferred form of the invention by way of illustration only, while the broad principle of the invention will be defined by the appended claims.

What I claim is:

1. A holder for optical instruments comprising a tubular barrel, means radially adjustable through the wall of the barrel for engaging and holding an optical instrument, cushioning material fitted over and embracing one end of the barrel, outer and inner clamp rings clamping said cushioning material in place, the inner clamp ring having an inwardly extending annular ledge forming a stop upon which the optical instrument may rest.

2. A holder for an optical instrument comprising a cylindrical barrel, means radially adjustable through the wall of the barrel for engaging and holding an optical instrument in the barrel, a strip of soft material folded over one end of the barrel, outer and inner clamp rings clamping said material in place, the fold of the soft material projecting slightly beyond the clamp rings, the outer end of the inside ring having an inwardly extended abutment forming a stop against which the optical instrument in the barrel may rest.

ADOLPHUS W. OWENS.